US005963719A

United States Patent [19]
Fite, Jr. et al.

[11] Patent Number: 5,963,719
[45] Date of Patent: Oct. 5, 1999

[54] TWO-PIN DISTRIBUTED ETHERNET BUS ARCHITECTURE

[75] Inventors: David B. Fite, Jr.; Elaine H. Fite, both of Northborough; Ron Salett, Framingham, all of Mass.

[73] Assignee: Cabletron Systems, Inc., Rochester, N.H.

[21] Appl. No.: 08/589,512

[22] Filed: Jan. 22, 1996

[51] Int. Cl.[6] .................................................. G06F 13/00
[52] U.S. Cl. .............................. 395/200.73; 395/200.55; 395/200.8
[58] Field of Search ........................ 395/200.55, 200.8, 395/200.06, 500, 200.73

[56] References Cited

U.S. PATENT DOCUMENTS

| | | | |
|---|---|---|---|
| 4,418,386 | 11/1983 | Vrielink | 364/200 |
| 5,301,303 | 4/1994 | Abraham et al. | 395/500 |
| 5,430,762 | 7/1995 | Vijeh et al. | 375/211 |
| 5,452,308 | 9/1995 | Kaminski et al. | 371/20.1 |

FOREIGN PATENT DOCUMENTS

| | | |
|---|---|---|
| 495575 | 7/1992 | European Pat. Off. . |
| 0 596 694 | 5/1994 | European Pat. Off. . |

*Primary Examiner*—Meng-Ai T. An
*Assistant Examiner*—Walter D. Davis, Jr.
*Attorney, Agent, or Firm*—Wolf, Greenfield & Sacks, P.C.

[57] ABSTRACT

An intermodule network bus architecture using only two bus wires to transmit data and module state information. A two-pin bus interface in each network module connected to the bus provides for a distributed arbitration procedure in the event that two or more modules are competing for bus access, and provides a coding scheme under which both data signals and collision announcements are transmitted from module to module through the two-wire bus. The architecture handles multiple distributed repeater modules, as well as other network components such as bridges and routers connected to the same bus. An important aspect of the invention is that multiple bus interfaces function as a distributed state machine, to handle the arbitration process and to provide a consistent framework for detecting and processing data signals and various types of collisions, including receive collisions detected on a single local module port, and transmit collisions involving activity on multiple local ports of one or more modules.

2 Claims, 3 Drawing Sheets

FIG. 2

| FIG. 2A | FIG. 2B |

FBI INPUTS/OUTPUTS
DATAI/DATAO
ARBI/ARBO
TERMS

LOCAL PORT INPUTS
DATAIN
COLLIN

LACTIVE = COLLIN (ANY LOCAL PORT) +
(DATAIN (ANY LOCAL PORT) • JAMMING)
-EXT_CNT_DONE

LCOL = COLLIN (MORE THAN ONE LOCAL PORT) +
(DATAIN (MORE THAN ONE LOCAL PORT) • -JAMMING

LRXCOL = COLLIN (N)

I IS A 3 BIT COUNTER USED DURING ARBITRATION

FTCOL IS A FLAG FOR "REPEATER IN TCOL"

N IS THE FIRST ACTIVE LOCAL PORT
M IS THE LAST ACTIVE LOCAL PORT
RESET EXTEND COUNTER WHEN
ENTER ARB FROM FIDLE OR WAIT
OR WHEN ENTER (SET) FTCOL

ON UNSPECIFIED/ILLEGAL CONDITIONS
GOTO FRECV

I<3 • LACTIVE •
DATAI EQL MYID<I>  —(A)

ARBO = 1
I = I + 1
DATAO = MYID<I>
FTCOL = FTCOL + LCO
OUT(ALLXN) = JAM
OUT(N) = FTCOL • JAM
—(B)

I EQL 3 • LACTIVE •  —(C)
DATAI EQL MYID<1>

FTCOL = FTCOL + LCO
ARBO = -DATAIN(N) + FTCOL + LRXCO
DATAO = DATAIN(N) + FTCOL + LRXCOL
OUT(ALLXN) = SAME AS DATAO
OUT(N) = FTCOL • JAM

GOTO WAIT

-(ARBI • DATAI) •
-LCOL • LRXCOL

ARBO = 1
DATAO = 1
OUT(ALLXM) = JAM

-(ARBI • DATAI) •
LACTIVE •
-LCOL • -LRXCOL

ARBO = •DATAIN(N)
DATAO = DATAIN(N)
OUT(ALLXN) = DATAIN(N)

FTCOL = 0
OUT(ALL) = IDLE

-LACTIVE

FSEND

LCOL + (ARBI • DATAI •
LACTIVE
-LRXCOL • -FTCOL)

ARBO =
-EXT_CNT_DONE
DATAO = 1
FTCOL = 1
OUT(ALL) = JAM

GOTO WAIT

FTCOL = 0
OUT(ALL) = IDLE

ARBI • DATAI •
LACTIVE • -LCOL •
(LRXCOL + FTCOL)

DATAO = 1
OUT(ALLXM) = JAM

-ARBI • -LACTIVE

OUT(ALL) = IDLE
TW = TW + 1

TW_DONE

TW = 0

WAIT

TW_DONE

GOTO FIDLE

GOTO WAIT

FTCOL = 0
OUT(ALL) = IDLE

MTCOL

-ARBI •
LACTIVE •
-LCOL

DATAO = 1
ARBO =
-EXT_CNT_DONE
OUT(ALL) = JAM

DATAO = 1
OUT(ALLXM) = JAM

ARBI •
-LACTIVE

I = -1
OUT(ALL) = JAM (D)

GOTO ARBWT

LACTIVE •
(ARBI + LCOL)

FTCOL = 1

I = -1
FTCOL = 1
OUT(ALL) = JAM

-ARBI •
-LACTIVE

MRCOL

ARBI •
-LACTIVE

LACTIVE •
-ARBI •
-LCOL

DATAO = 1
FTCOL = 0
OUT(ALLXN) = JAM

FIG. 2A

TWO-PIN DISTRIBUTED ETHERNET BUS ARCHITECTURE

BACKGROUND OF THE INVENTION

This invention relates generally to communication networks or local area networks (LANs) and, more particularly, to the architecture of a network hub for the interconnection of multiple network components, such as multiport repeaters, bridges, switches and routers. Bridges, switches and routers are connected to more than one network and provide a convenient mechanism for transferring data packets between one network and another. Multiport repeaters perform a similar function, but operate at a bit level rather than a message packet level. Repeaters operate practically in "real time" to relay messages bit-by-bit from one port to other ports, while bridges and routers may store data packets temporarily, and perform an intelligent message routing function.

Even more particularly, the invention applies to networks that employ a protocol commonly referred to as Carrier Sense Multiple Access with Collision Detection (CSMA/CD). One CSMA/CD design that is widely used in networks is known as Ethernet. The Ethernet design is specified by standards documents ISO 8802-3 and ANSI/IEEE 802.3, which will be referred to as the IEEE 802.3 standard. Although the mode of operation of networks under CSMA/CD rules is not directly pertinent to the present invention, a brief explanation follows by way of further background. Under the CSMA/CD rules for access to a network bus or cable, any station wishing to transmit must first "listen" to make sure that the cable is clear before beginning to transmit. All stations on the network have equal priority of access and may begin transmitting as soon as the line is clear and any required inter-packet delay has elapsed. However, if a first station that has started transmitting detects a "collision" with a transmission from another station, the first station continues transmitting for a short time to make sure that all stations wishing to transmit will detect the collision. Every other station detecting the collision also continues to transmit for a short time. Then each station that has detected a collision terminates transmission for some random period of time. The stations involved in the collision select random, and therefore usually different, delay times before trying transmission again.

A repeater is a device having multiple ports, each of which may be connected to single or multiple network stations. The IEEE 802.3 standard, in its Sections 9.1 to 9.8, sets forth a standard design of a repeater employing the CSMA/CD collision detection method. In one embodiment, a repeater is connected in a star configuration with one station connected to each port of the repeater. In an alternative embodiment, a port of the repeater may be connected to a plurality of stations by a transmission medium operating as a single Ethernet link. Thus, a repeater may have many more stations connected to it than there are ports on the repeater.

A repeater, in effect, logically connects the wires on its input ports such that all the devices connected to those wires are in the same network "collision domain." However, the repeater does not connect the ports by a simple electrical connection. Instead, the repeater listens to signals on each of the ports and repeats those signals on the other ports. One of the functions of a repeater is to detect collisions on one or more of its ports and to take appropriate action consistent with the IEEE 802.3 standard. For example, if a collision is detected on one port, when the incoming signal on that port indicates that more than one station is transmitting, the repeater must advise the stations on its other ports of the existence of a collision, by sending out a standard jamming signal through all the other ports. This type or collision is usually referred to as a "receive" collision. Another type of collision situation arises when a repeater receives data over two or more active ports simultaneously. The repeater is then aware of a collision, but none of the stations connected to the ports are aware of a collision, even the stations connected to the active ports from which the signals were received. This is called a "transmit" collision, and the repeater responds by sending jamming signals to all of its ports.

Repeaters provide a convenient mechanism for expanding networks. The IEEE 802.3 standard requires that the number of repeaters encountered by a transmitted message before a bridge or router is encountered, be limited in number. To meet this limitation but still provide for further network expansion, network designers use multiple "half-repeaters," each of which may have as many ports as a conventional repeater, but which are closely coupled together by an inter-repeater bus structure. The bus structure not only provides for the transmission of Ethernet data between two half-repeaters, but also transmits state information between the two modules, such that they cooperate to perform the function of a single repeater.

Half-repeaters are typically installed in a central wiring facility referred to as a hub, which includes a backplane of multiple conductors, i.e. a bus, into which the half-repeater modules are removably plugged. The interface between the bus and the half-repeater modules is standardized such that other network components, such as bridges, routers, and individual stations, may also be plugged into the bus. Since, multiple half-repeaters or other modules all have a need to transmit data and state information over a common bus, some form of arbitration must be provided to regulate bus usage. In general, there are two categories of bus arbitration schemes: central arbitration and distributed arbitration. Prior to the present invention, hub designs have included inter-repeater buses (IRBs) or intermodule buses (IMBs) having several parallel conductors. For example the IRB manufactured by AMD uses a centrally arbitrated bus scheme with four common bus pins and one additional request pin for each half-repeater. This requires six pins for two half-repeaters, seven pins for three half-repeaters, and so forth. An alternative intermodule Ethernet bus (IMB) scheme using distributed arbitration is defined in pending patent application Ser. No. 08/270,072, filed Jul. 1, 1994, entitled "Hot-Swappable Inter-Module Interconnect of Simultaneous Use with Distributed LAN Repeaters and Stations," assigned to the same assignee as the present invention and having attorney Docket No. 93-0393. This scheme allows up to fifteen half-repeaters or other Ethernet devices to communicate over six pins in the bus.

It will be appreciated from the foregoing that there is still a need for improvement in the design of network hubs for interconnecting half-repeaters and other network components. Ideally, the intermodule bus should be as simple as possible to minimize the size and cost of the interconnection architecture, but without detracting from its functionality. The present invention meets this goal.

SUMMARY OF THE INVENTION

The present invention resides in a two-pin bus architecture with a distributed arbitration scheme allowing a number of half-repeaters or other network components to share the same bus. Briefly, and in general terms, the two-pin bus architecture of the invention comprises an intermodule bus having only two conductors; and at least two network components, each having a two-pin bus interface unit connecting the network components to the bus. The two-pin interface units together provide a distributed arbitration scheme, for controlling access to the bus when more than one network component is seeking access at approximately the same time. More specifically, the architecture provides for the transfer of network data from one component or module to another, and for the transfer of state information from one network component to another, to facilitate cooperation of multiple network components connected to the bus. In an illustrative embodiment of the invention, at least two of the network components are half-repeaters, each having multiple local ports connectable to other network components, and the two-pin interface units together provide for transfer of state information from one half-repeater to another, to maintain synchronous operation of the half-repeaters.

Each two-pin bus interface unit includes an identification code that uniquely identifies the interface unit; a first circuit for detecting local activity on multiple local ports of the network component, the local activity including data and collision information; a second circuit, responsive to detection of local activity by the first circuit, for transmitting the identification code onto one of the bus conductors during an arbitration phase of operation, and detecting whether the interface unit has gained access to the bus; and a third circuit, operative after the arbitration phase, for transmitting onto the bus a coded representation of the locally detected activity.

The invention may also be defined in terms of a two-pin bus interface for coupling a network module to a two-conductor intermodule bus, the bus interface comprising a state machine having an idle state in which idle codes are transmitted onto the intermodule bus; an arbitration state in which module identifying codes are transmitted onto the intermodule bus by a state machine in a master mode, to arbitrate for bus access; a send state in which data codes are transmitted onto the intermodule bus and transmitted to local ports associated with the bus interface; at least one master collision state in which collision codes are transmitted onto the intermodule bus; an arbitration wait state in which a state machine in a slave mode participates in arbitration with at least one other state machine; a receive state in which a state machine in the slave mode receives data from the bus and transmits it to local ports associated with the bus interface; at least one slave collision state in which collision codes are received from the bus and relayed to the local ports associated with the bus interface; a set of state machine commands defining conditions necessary to effect transitions from state to state; and a set of state machine responses defining functions performed by the state machine when making a transition from one state to another; wherein state machines of multiple bus interfaces connected to the bus operate in cooperation to perform distributed arbitration for bus access and to transfer data and state information from one bus interface to another. More specifically, the at least one master collision state includes a master receive collision state for announcing a receive collision detected on one local port associated with the bus interface, and a master transmit collision state for announcing a transmit collision involving activity on more than one local port, at least one of which is associated with this bus interface; and the at least one slave collision state includes a slave receive collision state for processing an announcement of a receive collision detected by another bus interface, and a slave transmit collision state for processing an announcement of a transmit collision detected by another bus interface. In the illustrative embodiment of the invention, the intermodule bus has first and second lines, which carry signals of "0" state or "1" state. The idle codes are "0" state signals on both first and second lines. Data and state information is transmitted in a signal sequence beginning with identifying codes during arbitration and followed by a data sequence or collision state announcement. The module identifying codes transmitted during arbitration include successive identifying bits transmitted onto the first line and "1" codes simultaneously transmitted onto the second line. The data codes are transmitted as pairs of complementary data bits on the first and second lines; and the collision codes begin with a "1" code on both first and second lines, and continue with a string of "1's" on the first line and a string of either "1's" or "0's" on the second line, to differentiate between receive collisions and transmit collisions.

In method terms, the invention may be defined as a sequence of steps performed in each interface module to coordinate operation of at least two network modules connected together through an intermodule bus having only first and second lines. The invention comprises the steps of: assuming an idle state when there is no network activity in the module or on the bus lines; detecting local activity in the form of data or collision signals in any of a plurality or local ports associated with the network module; upon detection of local activity, participating in an arbitration process to gain access to the bus; transmitting data signals received from a local port to the other local ports and to other modules over the bus lines; transmitting collision announcements over the bus lines to other modules when a collision is detected by this module; receiving data signals from other modules over the bus lines and transmitting these data signals out through the local ports; detecting collision announcements transmitted over the bus lines from other modules; and transmitting jamming signals to local ports when a collision is detected in this module or when a collision announcement is received from another module.

In the method of the invention, the step of participating in an arbitration process includes transmitting onto the first bus line a sequence of binary identification signals unique to this module; verifying, after the transmission of each binary identification signal, that no identification signal of higher priority has been transmitted onto the bus; if a higher priority identification signal is detected, sending jamming signals to all the local ports of this module and transmitting a binary "1" on the second bus line, to indicated a collision at the end of the arbitration process; and if no higher priority identification signal is detected during the arbitration process, proceeding with transmitting data signals or transmitting collision announcements, based on the type of detected local activity. If the step of detecting local activity detects data signals at a local port, and if the arbitration process is completed successfully, the step of transmitting data signals is next performed, by sending a data stream over the first line of the bus and a complementary data stream over the second line of the bus. If the step of detecting local activity detects a receive collision involving signals at a single local port, and if the arbitration process is completed successfully, the step of transmitting collision announcements is next performed, by sending receive collision codes onto the bus lines, and the step of transmitting jamming signals is directed to all of the local ports except the one on which a collision was detected. The step of transmitting receive collision signals includes transmitting a stream of binary "1" signals onto the first bus line and on the second bus line transmitting a binary "1" signal followed by a stream of binary "0" signals.

If the step of detecting local activity detects a transmit collision involving signals at more than one local port, and if the arbitration process is completed successfully, the step of transmitting collision announcements is next performed, by sending transmit collision codes onto the bus lines, and the step of transmitting jamming signals is directed to all of the local ports. The step of transmitting a transmit collision code includes transmitting binary "1" signals onto both first and second bus lines.

If the module detects no local activity, it performs the steps of waiting for arbitration to conclude; processing signals received over the bus after arbitration; if the signals received are data signals, performing the step of transmitting the data signals out through the local ports; and if the signals received are collision signals, performing the step of transmitting jamming signals to all of the local ports.

It will be appreciated from the foregoing that the present invention represents a significant improvement in the field of network communications, and specifically in the design of intermodule buses for interconnection of half-repeaters and other network components. In particular, the invention provides for intermodule communication of data and state information over only two bus wires, with an accompanying saving in space and cost of intermodule buses in backplane communication hubs. Other aspects and advantages of the invention will become apparent from the following more detailed description, taken in conjunction with the drawings.

DESCRIPTION OF THE PREFERRED EMBODIMENT

Figure 1:
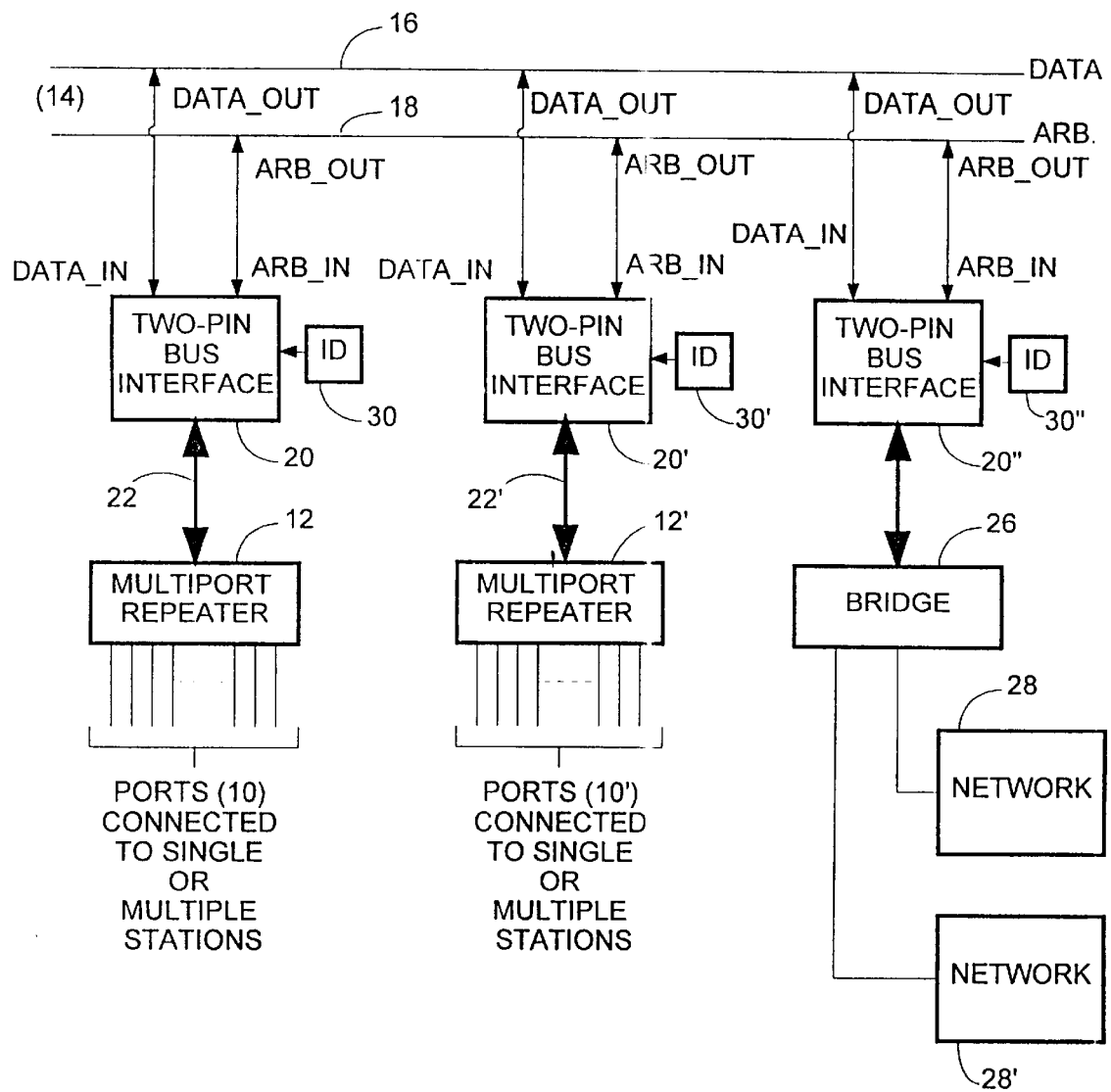
FIG. 1 is a simplified block diagram of a portion of a communication network including a hub with at least two half-repeaters and an intermodule bus with only two conductors, in accordance with the invention.

As shown in the drawings for purposes of illustration, the present invention pertains to a two-wire bus architecture for interconnection of half-repeaters or other network components. In the past, network components have been interconnected at a central hub by means of an intermodule bus having several parallel wires. For inter-repeater connection, multiple wires have been needed to carry both Ethernet data and state data pertaining to half-repeaters, to ensure that the half-repeater modules operate appropriately in unison. In some prior bus architectures, the number of bus wires increases with the number of half-repeaters that can be accommodated on the bus. In others, a fixed number of bus wires is used.

In accordance with the present invention, an intermodule bus having two conductors effects the interconnection of half-repeaters and other network components, such as bridges and routers, and a distributed state machine arbitrates access to the bus and transmits state data among the interconnected modules. The invention is described in this specification in the context of a distributed state machine for the interconnection of half-repeaters, but it will be understood that the state machine described is also applicable to the interconnection of bridges and repeaters, which present a logically simpler situation than half-repeaters.

Communication networks using CSMA/CD, such as Ethernet networks, are inherently limited in extent, but various architectures are used to combine networks into a single collision space. As shown in FIG. 1, multiple networks may be connected to some of the ports 10 of a multiport half-repeater 12. A second half-repeater 12' is shown as having multiple ports 10' to which other networks or stations may be connected. Both half-repeaters 10 and 10' are coupled to an intermodule bus 14, through which Ethernet data and repeater state information are transmitted. In the past, intermodule buses have had to include several parallel conductors to convey this information, but in accordance with the present invention the bus 14 has only two conductors 16 and 18, designated the data line and the arbitration line, respectively. As will become clear from the following description, the terms "data" and "arbitration" are arbitrary, because both lines are used to convey both data and state information.

The multiport half-repeaters 12 and 12' perform the functions of a conventional half-repeater module. These functions include receiving data and collision signals through the multiple ports 10 and 10', and transmitting jamming signals over selected ones of the ports. Each half-repeater further includes, in accordance with the invention, a two-pin bus interface 20 and 20', respectively, each of which receives data and collision status information over lines 22 and 22' from the half-repeaters 12 and 12', and is coupled to the bus wires 16 and 18. In particular, each two-pin bus interface generates output signals (DATAO to data line 16, and ARBO to arbitration line 18) and receives input signals (DATAI from data line 16 and ARBI from arbitration line 18). FIG. 1 also shows a bridge 26 connected to the bus 14 through its own two-pin bus interface 20". The bridge 26 is shown by way of example as providing connection to two separate networks 28 and 28'. Each of the two-pin interface units 20, 20' and 20' has an associated identifier (ID) register 30, 30' and 30", which uniquely identifies the device connected to the bus 14, i.e. identifies one of the multiport half-repeaters 12 and 12' or the bridge 26. As mentioned above, operation of the two-pin bus interfaces is best described in relation to the multi-port half-repeater function. Operation of the two-pin interface 20" associated with the bridge 26 is a less complicated case than the half-repeater function.

In response to data activity on the ports 10 and 10', the two-pin bus interface units 20 and 20' generate appropriate signals for transmission over the inter-repeater bus 14, and generate appropriate jamming signals for transmission onto selected ones of the ports 10 and 10', when necessary. The collective operation of the two-pin bus interfaces 20 and 20' is best described as a distributed state machine, as illustrated in FIG. 2.

In general terms, a state machine may be defined as having a set of states, a set of commands, a set of responses, and a function that assigns a response/state pair (i.e., a response and a state) to each command/state pair (i.e., a command and a state). When the machine is in a particular state, the occurrence of a command (usually in the form of a logical combination of signal conditions) causes the machine to execute a preselected response (usually by setting or clearing preselected signal conditions) and then to assume a new state (or remain in the same state). Illustrating a logical machine in the form of a state machine is often more useful than attempting to construct functional flowcharts. The state machine diagram facilitates understanding of the complex combinations of conditions that can occur in the machine, and ensures that all such combinations have been contemplated and explained. In addition, the state machine diagram provides a complete definition of the device to which it pertains, apart from specific parameters involving timing, which will depend largely on the nature of the final product embodying the invention.

Figure 2B:
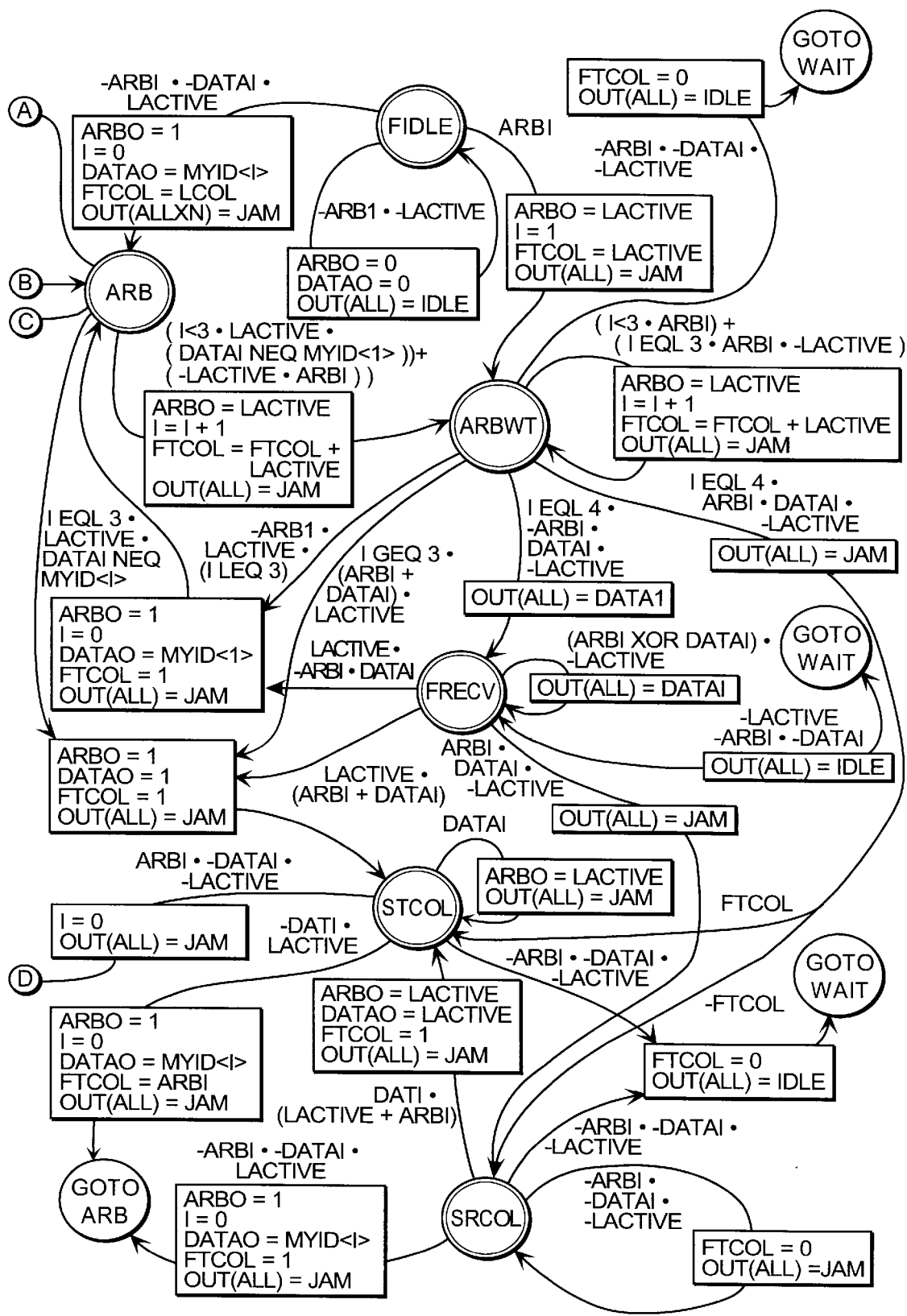
FIG. 2 is a diagrammatic representation of a distributed repeater state machine in accordance with the present invention.

In FIG. 2, the larger circles represent different states and it will be observed that there are ten states in all. The smaller circles represent connectors to other states, and are used only to reduce the number of connection lines in the figure. Each line with an arrowhead represents a change of state of the machine, or a "same state" result. The expressions adjacent to the transition lines are the state machine "commands," i.e. the conditions that cause the state to change or remain the same. The expressions in rectangular blocks interposed in the state transition lines are the state machine "responses" that occur as a result of the commanded transitions to the various states.

Another important aspect of the state machine diagram is that, although it represents all the states and transitions of a two-pin bus interface (20 or 20'), it is important to understand that two or more of these similar state machines operate in concert to perform distributed arbitration for use of the bus 14 and to achieve the transfer of data and state information. Moreover, if two (or more) state machines are involved in arbitration, they assume one of two different modes in the arbitration and information transfer procedure. For convenience, these are referred to as the "master" and "slave" modes, but these terms should be regarded more as labels than as descriptive terms. The interface operating in the "master" mode is simply the one that is first to transmit on the bus, or the one that is currently "winning" in an arbitration process, while the "slave" mode refers to other interfaces participating in arbitration or information transfer over the bus. As will be seen as the description proceeds, the master and slave roles of two bus interface units may be reversed in the course of arbitration.

Overview of Operation

There are four basic patterns transmitted onto the bus 14, depending on whether the half-repeater is idle, transmitting a packet of data, transmitting a transmit collision signal, transmitting a bus collision signal, or transmitting a receive collision signal. The following are the formats of the signals transmitted on the DATA and ARB lines of the bus 14 for each of these signal events:

| Event | DATA | ARB |
| --- | --- | --- |
| Idle | 0 | 0 |
| Data Packet | ID <0,1,2,3> then data | 1111 then NOT data |
| Bus/Transmit Coll. | ID <0,1,2,3> then 111 . . . | 1111 then 1 111 . . . |
| Receive Coll. | ID <0,1,2,3> then 111 . . . | 1111 then 1 000 . . . |

"ID<0,1,2,3>" refers to the transfer of four successive identifier bits in the identifying code. Of course, there is nothing critical about a four-bit code and the ID may have a larger or smaller number of bits, as desired. A four-bit ID code provides for up to fifteen network modules to be connected to the bus.

It will be understood from the foregoing table that the encoding convention used for the DATA and ARB lines is such that 0-0 always represents an idle condition, and that the meaning of any other encoding (0-1, 1-0 or 1-1) will depend on the encoding sequence. In the normal case in which a data packet is transmitted on the bus 14, the first four bits of the data packet preamble are replaced by an ID code on the DATA line and a sequence of four 1's on the ARB line. These four bits are followed by the remainder of the data packet, transmitted in normal form on the DATA line and in inverted or complementary form on the ARB line. If the bus interface detects its own ID on the DATA input line, and there is no detection of another module having sent 1's on both DATA and ARB lines, then this bus interface is the only one active on the bus. If both DATA and ARB are asserted at any time during transmission of the packet, or if the interface detects the inverted form of its ID during initial arbitration, the interface reverts to following the rules for a bus collision. In any event, receiving modules must replace the first four (ID) bits with the sequence 1010, which normally appears at the start of a data packet preamble.

For a receive collision, i.e. when the bus interface learns from the multiport half-repeater that only one port has encountered a collision condition, four 1's are asserted on the ARB line while the ID is transmitted on the DATA line, just as in the case of transmitting a data packet. Following the ID bits and 1's, both ARB and DATA are asserted for one more bit time, to indicate a collision condition. Then the ARB signal is dropped to zero and 1's continue to be asserted on the DATA line. If the ID of this bus interface is returned on the DATA line, and no other module asserts the ARB line, then this is the only interface that is active. The event is ended when the local port goes idle and a full packet of bit times has passed (typically 96 or 128 bits). If ARB is asserted any time during the packet, or an inverted ID is returned during initial arbitration, this indicates the presence of another active bus interface. The bus collision rules are then followed. Again, receiving modules have to replace the initial ID bits with a "1010" sequence.

If a transmit collision is detected within one module, i.e. two or more local ports are active, this condition is handled by transmitting 1's on both the ARB and DATA lines for at least 96 or 128 bit times after the ID bits have been asserted. If the local ID appears on the DATA line for the four cycles of arbitration, then this interface unit has won the arbitration, but may not necessarily be the only module competing for bus access. When the 96 bit times have passed, the ARB line is no longer asserted, but a "1" continues to be asserted on the DATA line to signal that only one module is left. When there is only one active port, the module changes its state to indicate "one port left." Details of operation in the event of a transmit collision, as well as the more complicated case of a bus collision, where more than one module competing for the bus has local port activity, will be best left until after an explanation of operation of the bus interface state machine.

Detailed Description of the Bus Interface State Machine

The bus interface of the present invention is best described and understood when represented as a state machine. The machine has ten states, indicated by the large circles in the FIG. 2 diagram. The states are:

FIDLE—Idle.
ARB—Arbitrate (master module).
ARBWT—Arbitrate wait (slave module).
FSEND—Send (master module).
FRECV—Receive (slave module).
MTCOL—Master transmit collision.
STCOL—Slave transmit collision.
MRCOL—Master receive collision.
SRCOL—Slave receive collision
WAIT—Wait before returning to idle state.

The convention used in the figure is that the asterisk (*) means a logical AND, the plus sign (+) means a logical OR and the minus sign (−) before a symbol or expression means NOT or inversion. As indicated in the legend accompanying the figure, inputs to the machine from the associated half-repeater include DATAI (input from the DATA line) and ARBI (input from the ARB line). Similarly, outputs include DATAO and ARBO. Local port inputs are DATAIN (for input data) and COLLIN (for a local port collision indication). As also indicated in the legend, various other symbols are defined or derived from the inputs, as follows:

LACTIVE = COLLIN (ANY LOCAL PORT) +

(DATAI (ANY LOCAL PORT) * -JAMMING) +

-EXT_CNT_DONE, where JAMMING whether jamming is taking place, and EXT_CNT is an extended counter that is reset whenever entering the ARB state from the FIDLE state. Thus, LACTIVE indicates local activity when there is either a collision indicated on any port, or data input from any port, in the absence of jamming, or when the extend count is not completed. The extend count is an internal counter used to ensure that data and collision announcements are sustained for at least a minimum number of bit times, such as 96 bit times.

LCOL = COLLIN (MORE THAN ONE LOCAL PORT +

(DATAI (MORE THAN ONE LOCAL

PORT) * -JAMMING).

Thus, LCOL indicates a local collision condition if there is a collision indication from more than one port, or if there is data input from more than one local port, in the absence of jamming.

LRXCOL=COLLIN (N), indicating a local receive collision.

N is the first active local port, and M is the last active local port.

FTCOL is a flag used to indicate past detection of a transmit collision condition.

The following descriptive sections describe each of the ten states (except the WAIT state), and the possible state machine paths into and out of each state. This complete description will provide a better basis for understanding operation of the state machine in the most commonly occurring situations.

FIDLE

This is the state in which the machine remains when there is no local activity and nothing is being received on the ARB line. As indicated in the figure, the machine stays in this state if (-ARBI*-LACTIVE), i.e. ARBI=0 and LACTIVE=0. Staying in the FIDLE state means that ARBO and DATAO are both output as zero, and the local outputs are all set to "idle" (OUT(ALL)=IDLE). The machine gets out of the FIDLE state in one of two ways: by going either to ARBWT or to ARB.

If a "1" is received on the ARBI (input) line, this indicates that another module is sending data or sending collision information. The machine performs the following functions before going to the ARBWT state: outputs the LACTIVE state on output ARBO (1 if there is local activity, 0 if not), sets FTCOL to LACTIVE (1 if there is local activity, 0 if not), sets an arbitration counter (I) to 1, and outputs a JAM signal on all local ports (OUT(ALL)=JAM). At this point, the machine functions in the "slave" state and waits at ARBWT for arbitration to conclude.

If there is no input on ARBI and DATAI, but there is local activity (LACTIVE=1), the machine makes a transition to the ARB state, after performing the following functions: setting the ARBO output to 1, setting the arbitration counter (I) to 0, setting the data output DATAO to the first ID (MYID <i>), setting FTCOL to LCOL to indicate whether there is a local collision, and outputting JAM signals on all local ports except N (OUT(ALLXN)=JAM). At this point, the machine functions in the "master" mode and commences arbitration at ARB.

ARBWT

This is the state in which arbitration takes place for machines in the slave state. Once reaching the ARBWT state, the options in subsequent bit cycles are: (1) to stay in the ARBWT state, (2) to exit to the WAIT state, (3) transition to the ARB state, (4) transition to the FRECV state, (5) transition to the STCOL state, or (6) transition to the SRCOL state.

(1) The machine stays in the ARBWT state so long as the arbitration count (I) is less than three and the ARBI continues to be asserted, or if the arbitration count (I) is equal to three, ARBI continues to be asserted, and there is no local activity (LACTIVE=0). In the ARBWT state, the ARBO output is set to LACTIVE (1 if active, 0 if not), the arbitration counter (I) is incremented by one for each bit cycle, the state of FTCOL is update by ORing the previous value with LACTIVE, and all the local ports are jammed (OUT(ALL)=JAM). This is the normal mode of operation when the state machine starts out in the slave mode and stays in this mode for four cycles (bits) of transmission of the ID by another module operating in the master mode. As discussed below, for a normal data packet transmission, the machine will next make a transition to the FRECV state to continue receiving data bits in the packet transmitted by the module in the master mode.

(2) If the bus inputs ARBI and DATAI are both 0 and there is no local activity (LACTIVE=0), the machine makes a transition to the WAIT state, after setting FTCOL to 0 and outputting idle states on all the local ports. This transition occurs when the bus lines (DATA and ARB) go the idle condition for some reason. The WAIT state simply waits for a timer to expire and then makes a transition to the FIDLE state.

(3) If the arbitration count (I) is less than or equal to three, and if ARBI input is 0 and the there is local activity (LACTIVE=1), the state machine makes a transition to the ARB state and assumes the role of the master module. The ARBO output is set to 1, the arbitration counter is set to 0 (I=0), the DATAO output is set to MYID<i>, FTCOL is set to 1 and all the local ports are jammed (OUT(ALL)=JAM).

(4) Transition to the FRECV state occurs when the arbitration count reaches four (I=4), the first data bit is detected (DATAI=1 and ARBI=0), and there is no local activity (LACTIVE=0). The state machine is then ready to receive further data bits from the bus.

(5) Transition to the STCOL state (slave transmit collision) may occur through one of two possible paths. First, the transition may occur at any time after the arbitration count reaches three (I≧3), if at least one of the bus lines is asserted (not idle), and if local activity has been detected (LACTIVE=1). Before entering the STCOL state, the machine asserts a "1" on both the ARBO and DATAO output lines, sets FTCOL=1, and continues to output jamming signals on all local ports (OUT(ALL)=JAM). Transition to the STCOL state may also occur at the completion of arbitration (when I=4), upon the receipt of a "1" on both the DATAI and ARBI inputs, but with no local activity (LACTIVE=0) and with FTCOL=1, indicating that there is probably a transmit collision because local activity had been detected since leaving the idle state. Since ARB and DATA and FTCOL are already set, the only action taken before assuming the STCOL state is to continue outputting jamming signals to all local ports (OUT(ALL)=JAM).

(6) Transition to the SRCOL state (slave receive collision) also takes place if DATAI and ARBI are "1" when I=4 and there is no local activity (LACTIVE=0). As indicated above in (5), when these conditions occur and FTCOL is set, the transition is to the STCOL state. However, if the same conditions occur and FTCOL is clear, this is assumed to be a receive collision, and the machine makes a transition to the SRCOL state, while continuing to output jamming signals on all local ports (OUTPUT(ALL)=JAM).

FRECV

As discussed above with reference to ARBWT, the receive state (FRECV) is reached normally from the ARBWT state when arbitration is complete and the first data bit is received on the DATA and ARB lines. FRECV is also used as a default state, to be entered upon detection of any illegal condition that is not otherwise specified in the state machine. After entering the FRECV state, the machine has five possible actions to take in subsequent bit cycles:

(1) Process the incoming data and stay in the FRECV state. This action will take place so long as incoming data bits are detected by the presence of complementary states on the DATA and ARB lines (ARBI XOR DATAI=1), and there is no local activity (LACTIVE=1). When the state machine remains in the FRECV state, the incoming data is output through all of the local ports (OUT(ALL)=DATAI).

(2) Exit through the WAIT state upon detecting an idle condition on the bus (DATAI=ARBI=0) and no local activity (LACTIVE=0). Before exiting, idle signals are output to the local ports (OUT(ALL)=IDLE).

(3) Transition to the ARB state if the bus is idle (DATAI=ARBI=0) and local port activity is detected (LACTIVE=1). As when entering the ARB state from FIDLE, a "1" is output on ARBO, and MYID<1> is output on DATAO. FTCOL is set to a "1" and all the local ports are jammed (OUT(ALL)=JAM).

(4) Transition to the slave transmit collision state (STCOL) if local activity is detected (LACTIVE=1) and the bus is not idle (ARBI or DATAI is "1"). As when the STCOL state is entered from the ARBWT state, the machine first sets ARBO, DATAO and FTCOL to "1" and output jamming signals to all of the local ports (OUT(ALL)=JAM).

(5) Transition to the slave receive collision state (SRCOL) if there is no local activity (LACTIVE=0) and both DATAI and ARBI are "1." The output ports are sent jamming signals (OUTPUT(ALL)=JAM) before entering the SRCOL state.

STCOL

The slave transmit collision state (STCOL) is reached after arbitration and in the event of local activity (LACTIVE=1) or recent local activity (FTCOL=1). It may also be reached from the SRCOL state. Once in the STCOL state, there are four possible subsequent actions:

(1) If input signal DATAI=1, remain in the STCOL state and continue to jam the local ports (OUT(ALL)=JAM).

(2) If the bus becomes idle (DATAI=ARBI=0) and there is no local activity (LACTIVE=0), exit through the WAIT state, after first setting FTCOL=0 and outputting idle codes to the local ports (OUT(ALL)=IDLE).

(3) If the DATAI input goes to "0," indicating that the master machine on the bus has stopped asserting a "1" on the DATA line, and there happens to be local activity (LACTIVE=1), the state machine attempts to gain control of the bus by going to the arbitrate state (ARB), after first setting the ARBO output to "1", resetting the arbitration counter (I=0), setting the DATAO output to MYID<i>, setting FTCOL to the value of ARBI, and jamming the local ports (OUT(ALL)=JAM).

(4) If the DATAI input goes to "0," indicating that the master machine on the bus has stopped asserting a "1," but the ARBI input is "1," indicating that some other machine is present, and there is no local activity (LACTIVE=0), then the state machine goes to the ARBWT state to participate in arbitration as a slave module, after first resetting the arbitration counter (I=0) and continuing to output jamming signals to the local ports (OUT(ALL)=JAM).

SRCOL

The slave receive collision state (SRCOL) is reached from the FRECV state or from the ARBWT state when a "1" is received on both the DATAI and ARBI input lines. In subsequent cycles, there are four possible actions in the SRCOL state:

(1) If the DATAI and ARBI inputs are "1" and "0," respectively, and there is no local activity (LACTIVE=0), the machine stays in the SRCOL state, keeping FTCOL at "0" and continuing to output jamming signals to the local ports (OUT(ALL)=JAM).

(2) If the bus goes idle (DATAI=ARBI=0) and there is no local activity (LACTIVE=0), exit is made through the WAIT state, after setting FTCOL to "0" and sending idle signals to the local ports (OUT(ALL)=IDLE).

(3) If the DATAI and ARBI inputs are both "1," indicating that some other machine is signaling a transmit collision, or if DATAI is "1" and there is local activity (LACTIVE=1), which also signal a transmit collision, then the machine makes a transition to the STCOL state. The actions performed at the transition include setting both ARBO and DATAO to the value of LACTIVE, i.e., to "1" if there is local activity, setting FTCOL to "1," and continuing to jam the local ports (OUT(ALL)=JAM).

(4) If the bus goes idle (DATAI=ARBI=0) and there is local activity (LACTIVE=1), the machine makes a transition to the ARB state to attempt to gain control of the bus. As in the more direct path to the ARB state (from FIDLE), ARBO is set to "0," the arbitration counter is reset (I=0), DATAO is set to MYID<i>, FTCOL is set to "1" and all local ports are jammed (OUT(ALL)=JAM).

ARB

The ARB state is where arbitration is performed if this state machine is in the master mode. The ARB state is reached initially from the FIDLE state, as a result of detecting local activity (LACTIVE=1) when the bus is idle. The ARB state may also be reached from various other states when local activity is detected. Once in the ARB state, the state machine may perform any of four possible subsequent actions:

(1) The machine will stay in the ARB state so long as the arbitration counter is less than three (I<3), and there is continued local activity (LACTIVE=1), and the DATA line reflects the machine's own transmitted identifier (DATAI=MYID<i>). During the four cycles of arbitration, the state machine continues to output "1" on ARBO, output its own identifier (MYID<i>) on DATAO, and set FTCOL to the logical OR of FTCOL and LCOL. It will be recalled that LCOL is a local collision indicator, which is set when more than one port indicates a collision or more than one port has input data. If only one port is active, LCOL and FTCOL will remain at "0." On the local ports, the machine sends a jamming signal to all except the active port N (OUT (ALLXN)=JAM) and to output on the Nth port the logical AND of FTCOL and the JAM signal. Again, if only one port is active, no jamming signal will be sent to this (Nth) port.

(2) On the fourth cycle in the ARB state (I=3), if neither of the actions described below as (3) and (4) is taken, and if there is still local activity (LACTIVE=1), and if this machine's ID continues to be echoed on the DATA line (DATAI=MYID<i>), then the machine makes a transition to the FSEND state, to be described below. Before entering the FSEND state, the machine performs the following actions:

(a) Change FTCOL to FTCOL OR LCOL. As noted above, in the simple case where there is only one active port on this repeater, LCOL and FTCOL will remain at "0."

(b) Set the ARBO output to the inverse of DATAIN(N) OR FTCOL OR LRXCOL. Again assuming the simple case where there is data input on only one local port and there are no collisions, FTCOL and LRXCOL will be "0" and the inverse of the local port (N) data will be output on line ARBO. For a transmit collision or a receive collision, a "1" will be output on ARBO.

(c) Set the DATAO output to DATAIN(N) OR FTCOL OR LRXCOL. For a data transmission, the local port (N) data will be output on line DATAO. For a transmit or receive collision, a "1" will be output on DATAO.

(d) Output the same data as is on DATAO to all the local ports except N. For data input on port N, this means that the same data bits are broadcast to all the other local ports. For collisions, a "1" is output to the other local ports.

(e) Output on port N the logical AND of FTCOL and JAM. Thus, the Nth port is sent a jamming signal only if there is a transmit collision.

(3) The ARB state may be terminated prematurely (I<3) if the DATAI input line shows other than this machine's identifier bit (DATAI≠MYID<i>), or if local activity ceases (LACTIVE=0) and ARB is asserted by another machine (ARBI=1). In either event, the machine makes a transition to the ARBWT state and assumes the slave mode of operation, after first setting the ARBO output to the same state as LACTIVE ("1" if there is local activity), incrementing the arbitration count (I=I+1), updating the state of FTCOL (FTCOL=FTCOL OR LACTIVE), and outputting jamming signals to the local ports (OUT(ALL)=JAM). It will be observed that the effect of a transition from the ARB state to the ARBWT state when this machine's ID is not echoed back on the DATA line is to give priority to the machine with the highest numbered ID (if two machines are each transmitting an ID at the same time). If one machine is transmitting a "0" ID bit and a "1" is seen on the DATAI line, the machine with the "0" ID bit will "lose" the arbitration and will make a transition to the ARBWT state.

(4) Another way to leave the ARB state is by transition to the slave transmit collision (STCOL) state. As shown in the figure, this occurs in the last arbitration cycle (I=3), if there is still local activity (LACTIVE=1) and the data returned on the DATAI line is not the ID bit for this machine (DATAI≠MYID<i>). This detection of a different ID bit on the DATA line means that this machine has failed to survive the arbitration process on the last arbitration cycle. Since arbitration is complete, and this machine lost, it makes a transition to the transmit collision state and assumes the slave mode. ARBO, DATAO and FTCOL are each set to "1" and all the local ports are jammed (OUT(ALL)=JAM).

FSEND

The send state (FSEND) is reached after the state machine has successfully survived the arbitration process. (The transition from the ARB state is the only path to the FSEND state.) It will be recalled from the discussion of the ARB state that the FSEND state is entered with DATAO and ARBO primed to transmit in the first FSEND cycle either data and inverted data, respectively, or to transmit a "1" if there is a transmit or receive collision. On subsequent cycles in the FSEND state, there are five alternative actions:

(1) For the continuing transmission of data, DATAI and ARBI will not be both "1" and there is neither a local collision (LCOL=0, indicating not more than one port has data or a collision signal) nor a single receive collision (LRXCOL=0, indicating no collision signal on port N). The state machine remains in the FSEND state and transmits another data bit onto the bus (DATAO=DATAIN(N) and ARBO=the inverse of DATAIN(N)). The data bit from DATAIN(N) is also output to the other local ports (OUTPUT (ALLXN)=DATA(N)). This mode of operation will continue until the entire data packet has been transmitted.

(2) If DATAI and ARBI are not both "1" but there is a detected local collision on port N (LRXCOL=1), the state machine has to send a "1—1" code on DATAO and ARBO, to advise other components connected to the bus that there is a collision, and must also jam all the local ports except the one still active (OUT(ALLXM)=JAM). The state machine remains in the FSEND state.

(3) If local activity ceases (LACTIVE=0), the state machine makes a transition from the FSEND state to the WAIT state, and thence back to the FIDLE state.

(4) If, while in the FSEND state, a machine connected to the bus announces a collision by putting a "1" on both lines (DATAI=ARBI=1), and if there is still local activity (LACTIVE=1), and if there is no local collision condition (i.e. no collision of more than one local port, LCOL=0), and if there is either a local receive collision (on one local port, LRXCOL=1) or a set condition of FTCOL), then the state machine concludes that a receive collision condition exists and makes the transition to the master receive collision (MRCOL) state. Before the transition, DATAO is set to "1" and all the local ports except the active one are jammed (OUT(ALLXM)=JAM).

(5) If, while in the FSEND state, there is a detected local collision (LCOL=1), indicating a collision of more than one local port), or if there is local activity (LACTIVE=1), and if someone has asserted "1" on the two bus lines to indicate a collision (DATI=ARBI=1), and if there is no local receive collision on one port (LRXCOL=0), and there was no prior transmit collision (FTCOL=0), then the state machine concludes that this is a transmit collision situation and makes the transition to the master transmit collision (MTCOL) state. Prior to the transition, DATAO is set to "1," FTCOL is set to "1," and ARBO is set to the inverse of the state of the extend-counter-done flag. The extend counter counts up to a maximum number of bits, such as 96 bits, and functions to guarantee that collision announcements and other events will extend for at least this number of bits. Initially, the extend-counter-done flag will be "0" and a "1" will be transmitted on ARBO until the counter reaches its maximum value. Therefore, before entering the MTCOL state, the machine is primed to transmit "1—1" on DATAO and ARBO. All the local ports are jammed (OUT(ALL)=JAM).

MTCOL

Once in the master transmit collision (MTCOL) state, there are four possible subsequent actions:

(1) So long as there is local activity (LACTIVE=1) and ARBI remains a "1" or there is still a local collision (LCOL=1), then the state machine remains in the MTCOL state and continues to output "1—1" on DATAI-ARBI, and to output jamming signals on all the local ports.

(2) When ARBI drops to "0" or local activity ceases (LACTIVE=0), the state machine exits through the WAIT state, setting FTCOL to "0" and outputting idle signals on the local ports (OUT(ALL)=IDLE).

(3) When local activity ceases (LACTIVE=0) but ARBI is still "1," this state machine is no longer in the master mode, and goes to the ARBWT state to participate in the next arbitration, in the slave mode. In preparation for the arbitration, the arbitration counter is set to −1 (I=−1), and all the local ports are jammed (OUT(ALL)=JAM).

(4) While in the master transmit collision (MTCOL) state, the machine may determine that it should really be in the master receive collision (MRCOL) state. If the ARBI input goes to "0" and there is no detected local collision (LCOL=0), but there is still local activity (LACTIVE=1), this means that there is only one active port and that the machine should be in master receive collision (MRCOL) state. Before entering the MRCOL state, the machine sets DATAO to "1" and jams all except the active port (OUT(ALLXM)=JAM). (The ARB line of the bus is already "0.")

MRCOL

The master receive collision (MRCOL) state is reached from the FSEND state, either directly or through the master transmit collision (MTCOL) state. In either case, DATAO is set to "1" and all the local ports except the active one are jammed. Once in the MRCOL state, there are four possible actions:

(1) So long as there is local activity (LACTIVE=1) and ARBI remains at "0" and there is no detected local collision (LCOL=0), it is concluded that the only collision is on the one active port. The machine stays in the MRCOL state, sets DATAO at "1," clears FTCOL to "0," and jams all the output ports except the active one (OUT(ALLXM)=JAM).

(2) If there is still local activity (LACTIVE=1), but either ARBI goes to "1" (indicating that some other machine is announcing a collision) or LCOL goes to "1" (indicating that this machine has a local collision on two or more ports), then the status is that of a transmit collision. The machine makes the transition to the MTCOL state, after first FTCOL to "1," setting DATAO to "1" (to announce the collision), and setting ARBO to "1" if the extend count has not completed. Jamming signals are sent to all the local ports (OUT(ALL)=JAM).

(3) If local activity ceases (LACTIVE=0) and ARBI goes to "1" (indicating a collision announcement by another machine), this machine goes to the ARBWT state to participate in a possible arbitration, after first setting FTCOL to "1," setting the arbitration counter to −1 (I=−1), and sending jamming signals to all the local ports (OUT(ALL)=JAM).

(4) If the ARBI input is "0" and local activity ceases, the event is ended by exiting through the WAIT state, after clearing FTCOL to "0" and sending idle signals to the local ports (OUT(ALL)=IDLE).

Examples of Operation of the State Machine

The foregoing detailed description of the state machine illustrated in FIG. 2 is believed to cover every probable combination of events and state transitions. The following examples describe the state transitions that for some of the more commonly occurring situations.

1. Transmission of a data packet originating from a single active port a. Arbitration Machine A is assumed to have data activity on one active port and machine B is assumed to have no activity at all. Initially, both machines are in the FIDLE state. On detecting local activity (LACTIVE=1), machine A goes to the ARB state and begins sending its ID bits on DATAO over the next four bit cycles, while at the same time sending a "1" on ARBO, and jamming its other local ports. Machine B, on receiving a "1" on its ARBI input, goes to the ARBWT state and stays there for the four arbitration cycles, while jamming all of its local ports. When the arbitration is complete, i.e. machine A has successfully sent and received echoes of its ID bits, machine A goes to the FSEND state and machine B goes to the FRECV state.

b. Data transmission

Machine A takes the data received from its one active port and sends this data both to the other local ports and over the DATA and ARB lines (data on DATAO and inverted data on ARB). Machine B takes the data received on DATAI and transmits it to all of its local ports. This process continues until the end of the data packet, at which time machine A goes to the WAIT state. After receiving the last data bit, machine B also goes to its WAIT state and the data transmission is complete. It will be understood that machine B in this example is operating in the slave mode and is one bit cycle behind machine A, which is operating in the master mode.

2. Announcement of receive collision status a. Arbitration

It is assumed that machine A has detected a receive collision, i.e., has received a collision signal on only one of its local ports. For this example, it is also assumed that there is no activity at machine B, so the arbitration phase will proceed as before. Machine A will go to the ARB state and will successfully transmit its ID bits; machine B will go to the ARBWT state and will participate in the arbitration as the slave machine.

b. Collision announcement

At the conclusion of arbitration, machine A will go first to the FSEND state and will output "1" on both DATAO and ARBO, because of the local receive collision that has been detected (LRXCOL=1), and will jam its other ports. On the next cycle in the FSEND state, machine A will make a transition to the master receive collision (MRCOL) state, because of the local receive collision status (LRXCOL=1). After its final arbitration cycle, machine B will go to the slave receive collision (SRCOL) state, because it will detect DATAI and ARBI as "1" and will have no local activity. At this point, machine A will be in the MRCOL state and machine B will be in the SRCOL state. Machine A will then repeatedly output a "1" on DATAO and a "0" on ARBO, while machine B, upon continued receipt of a "1" on DATAI and a "0" on ARBI, will continue to jam all of its local ports. After the local port goes idle and 96 bit times have passed, the DATAO line is dropped to "0" to end the event. If the ARB line is asserted ("1") during the event, both machines follow the bus (transmit) collision rules, i.e., machine A goes to the master transmit collision (MTCOL) state and machine B goes to the slave transmit collision (STCOL) state. In all cases, the receiving modules must replace the first four (ID) bits with the code "1010."

3. Announcement of transmit collision status a. Arbitration

It is assumed that machine A has detected a transmit collision on its own local ports, i.e., has received collision signals or data signals on more than one of its local ports. For this example, it is also assumed that there is no activity at machine B, so the arbitration phase will proceed as before. Machine A will go to the ARB state and will successfully transmit its ID bits; machine B will go to the ARBWT state and will participate in the arbitration as the slave machine.

b. Collision announcement: At the conclusion of arbitration, machine A will go first to the FSEND state and will output "1" on DATAO and ARBO, because of the local transmit collision that has been detected (LCOL=1), and will jam its other ports. On the next cycle in the FSEND state, machine A will make a transition to the master transmit collision (MTCOL) state, because of the local collision status (LCOL=1). Then, in subsequent cycles, machine A will continue to transmit a "1" on DATAO and a "1" on ARBO. After its final arbitration cycle, machine B will go first to the slave receive collision (SRCOL) state, because it will detect DATAI and ARBI as "1" and will have no local activity. On the next cycle in the SRCOL state, machine B will again detect "1" on both DATAI and ARBI, and will make a transition to the slave transmit collision (STCOL) state. At this point, machine A will be in the MTCOL state and machine B will be in the STCOL state. Machine A will then repeatedly output a "1" on DATAO and a "1" on ARBO, while machine B, upon continued receipt of a "1" on DATAI, will continue to jam all of its local ports. When an extend counter expires, indicating that 96 bit times have passed, machine A drops the ARBO output but continues to assert the DATAO signal to indicate "one module left." The master (A) module will enter "one port left" status, i.e. the MRCOL state, when it has only one active port left. The slave modules (B) should stay in the STCOL state until the end of the event. When the last port is port goes idle, machine A drops the DATAO signal and the event is ended.

4. Announcement of bus collision status

If two modules detect local port activity at the same time, the state machines (A and B) of both will go first to the ARB state and they will assert "1" on the ARBO line for four cycles, while sending their ID bits on the DATAO line. If, at any stage in the arbitration, one machine sends a "1" and the other a "0," the machine that sent the "0" will not detect its own ID bit on the DATAI line and will make a transition to the ARBWT state, assuming the role of the slave machine. Thus, the machine with the larger ID, e.g. machine A, will win the arbitration in the event that more than one machine competes for bus access.

If the slave module detects local activity while arbitration is still taking place, it asserts a "1" on the ARBO line but lets the arbitration conclude. At the conclusion of arbitration, the slave machine (B) asserts a "1" on both DATAO and ARBO for the next cycle, when making a transition to the slave transmit collision (STCOL) state. Thereafter, machine B in the STCOL state continues to assert a "1" on the ARBO line if there continues to be local activity (LACTIVE=1). The arbitration winning machine (A) meanwhile makes a transition to the master transmit collision (MTCOL) state because it has received a "1" on ARBI and DATAI. In the MTCOL state, the master module continues to output "1" on DATAO and "1" on ARBO until at least 96 bit cycles have passed. At the conclusion of the 96 bit times, the master module (A) drops the ARBO signal to "0" but continues to drive the DATAO line until all of the module's local ports are idle. Similarly, the slave or slaves assert ARBO for at least 96 bit times and continue to drive ARBO to "1 " until their ports have gone idle.

If, after 96 bit times, the slaves' local ports all go idle before the master's, the slaves will drop from the ARB line, i.e., will no longer assert a "1" on ARBO. Because 96 bit times have passed, the master is also no longer asserting a "1" on ARBO. This indicates that only one module (the master) still remains on the bus. Then, if the master has only one active port remaining, it will enter the MRCOL state, which is equivalent to a "one-port-left" status. If another port became active at this stage, whether on the master or a slave module, the master would revert to the MTCOL state, resetting its extend coulter and driving both DATAO and ARBO for 96 more bit times. The slave modules remain in the STCOL state.

If the master module's ports go idle first (before the slaves' ports), the master module drops the DATAO output. The remaining modules with active ports will keep sending ARBO=1 and will rearbitrate for the DATA line by sending their ID bits on the DATA line. After the arbitration, all active modules drive both DATA and ARB for one cycle to signal that there is still a collision. Then the new master drives the DATA line, and the other modules drive ARB in the slave mode of operation. If no-one asserts ARB, and the new master module has only one active port, then the master module enters the one-port-left state (i.e., MRCOL state), and the other modules, as slaves, stay in the transmit collision state (STCOL).

An unusual, but possible, sequence of events arises if the winner in an arbitration has its local ports go idle before the end of the four-cycles of arbitration. The master module drops both DATA and ARB outputs and goes from the ARB state to the ARBWT state, from which it will exit through the WAIT state if there is still no local activity. Any still-active (slave) modules will still be driving ARB to a "1." At the end of arbitration, the slave modules will drive both DATA and ARB to signal a collision, and will go to the STCOL state. At this point, because there is no master module, the DATA line will be detected as "0" and all the active slave modules will go to the ARB state to begin a new arbitration.

Conclusion

It will be understood from the foregoing that the present invention represents a significant improvement in bus architecture for half-repeaters and other Ethernet components. In particular, the present invention provides an intermodule bus that has only two wires through which both data and state information are efficiently transmitted. More specifically, the invention includes a two-wire bus interface for each module connected to the bus, wherein the bus interfaces of multiple modules cooperate to provide a distributed arbitration scheme for access to the bus, and an encoding scheme to permit transmission of data, collision announcements and status information through the bus. The modules coupled to the bus may be half-repeaters or other conventional network components, such as bridges and routers. It will also be appreciated that, although a specific embodiment of the invention has been described in detail for purposes of illustration, various modifications may be made without departing from the spirit and scope of the invention. Accordingly, the invention should not be limited except as by the appended claims.

We claim:

1. A two-pin bus interface for coupling a network module to a two-conductor intermodule bus, the bus interface comprising a state machine having:

an idle state in which idle codes are transmitted onto the intermodule bus;

an arbitration state in which module identifying codes are transmitted onto the intermodule bus by a state machine in a master mode, to arbitrate for bus access;

a send state in which data codes are transmitted onto the intermodule bus and transmitted to local ports associated with the bus interface;

multiple master collision states in which collision codes are transmitted onto the intermodule bus, the master collision states including a master receive collision state for announcing a receive collision detected on one local port associated with the bus interface, and a master transmit collision state for announcing a transmit collision involving activity on more than one local port, at least one of which is associated with this bus interface;

an arbitration wait state in which a state machine in a slave mode participates in arbitration with at least one other state machine;

a receive state in which a state machine in the slave mode receives data from the bus and transmits it to local ports associated with the bus interface;

multiple slave collision states in which collision codes are received from the bus and relayed to the local ports associated with the bus interface, the slave collision states including a slave receive collision state for processing an announcement of a receive collision detected by another bus interface, and a slave transmit collision state for processing an announcement of a transmit collision detected by another bus interface;

a set of state machine commands defining conditions necessary to effect transitions from state to state; and a set of state machine responses defining functions performed by the state machine when making a transition from one state to another;

wherein state machines of multiple bus interfaces connected to the bus operate in cooperation to perform distributed arbitration for bus access and to transfer data and state information from one bus interface to another;

and wherein the intermodule bus has first and second lines, which carry signals of "0" state or "1" state, the idle codes are "0" state signals on both first and second lines, data and state information is transmitted in a signal sequence beginning with identifying codes during arbitration and followed by a data sequence or collision state announcement, the module identifying codes transmitted during arbitration include successive identifying bits transmitted onto the first line and "1" codes simultaneously transmitted onto the second line, the data codes are transmitted as pairs of complementary data bits on the first and second lines, and the collision codes begin with a "1" code on both first and second lines, and continue with a string of "1's" on the first line and a string of either "1's" or "0's" on the second line, to differentiate between receive collisions and transmit collisions.

2. A method for coordinating operation of at least two network modules connected together through an intermodule bus having only first and second lines, the method comprising the following steps performed in each of the network modules:

assuming an idle state when there is no network activity in the module or on the bus lines;

detecting local activity in the form of data or collision signals in any of a plurality or local ports associated with the network module;

upon detection of local activity, participating in an arbitration process to gain access to the bus;

transmitting data signals received from a local port to the other local ports and to other modules over the bus lines;

transmitting collision announcements over the bus lines to other modules when a collision is detected by this module;

receiving data signals from other modules over the bus lines and transmitting these data signals out through the local ports;

detecting collision announcements transmitted over the bus lines from other modules; and transmitting jamming signals to local ports when a collision is detected in this module or when a collision announcement is received from another module;

wherein the step of participating in an arbitration process includes transmitting onto the first bus line a sequence of binary identification signals unique to this module, verifying, after the transmission of each binary identification signal, that no identification signal of higher priority has been transmitted onto the bus, if a higher priority identification signal is detected, sending jamming signals to all the local ports of this module and transmitting a binary "1" on the second bus line, to indicated a collision at the end of the arbitration process, and if no higher priority identification signal is detected during the arbitration process, proceeding with transmitting data signals or transmitting collision announcements, based on the type of detected local activity;

and wherein, if the step of detecting local activity detected a receive collision involving signals at a single local port, and if the arbitration process was completed successfully, the step of transmitting collision announcements is next performed, by sending receive collision codes onto the bus lines, and the step of transmitting jamming signals is directed to all of the local ports except the one on which a collision was detected;

and wherein the step of transmitting receive collision signals includes transmitting a stream of binary "1" signals onto the first bus line and on the second bus line transmitting a binary "1" signal followed by a stream of binary "0" signals.

* * * * *